H. V. Edmond.
Advertiser.
No. 88,947.  Patented Apr. 13, 1869.
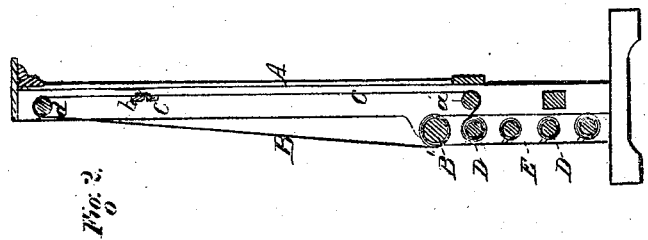
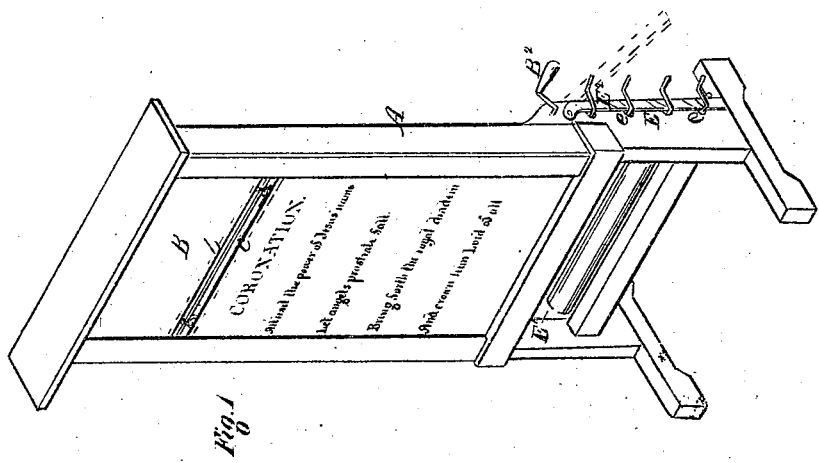
Witnesses.
J. Snowden Bell
Wm. H. Brereton
Inventor:
H. V. Edmond.
By Knight Bro's
Attorneys

HENRY V. EDMOND, OF NORWICH, CONNECTICUT.

Letters Patent No. 88,947, dated April 13, 1869.

IMPROVEMENT IN APPARATUS FOR EXHIBITING HYMNS, &c.

The Schedule referred to in these Letters Patent and making part of the same.

*To all whom it may concern:*

Be it known that I, HENRY V. EDMOND, of Norwich, in the county of New London, and State of Connecticut, have invented certain new and useful Improvements in Apparatus for Exhibiting Hymns, Diagrams, &c., of which the following is a full, clear, and exact description, reference being had to the accompanying drawings, which make part of this specification, and in which—

Figure 1 represents a view, in perspective, of my improved apparatus, and

Figure 2, a vertical section of the same.

My invention is an improvement upon that patented by me, July 30, 1867, and has for its object to provide a simple and convenient device whereby hymns, diagrams for illustrating lectures, &c., may be exhibited to an audience, as well as a means of bringing additional hymns or diagrams into view, and withdrawing them at pleasure; to which ends, My improvements consist—

First, in a detachable apron, connected to the apron upon which the hymns or diagrams to be first shown are placed, by hooks and eyes, or similar fastenings, so that, by the rotation of a crank, the first apron may be rolled up out of sight, and the additional, or detachable one brought to view at pleasure.

Second, in providing brackets at the rear of the roll-frame, in which any desired number of rollers and aprons may be placed, one of which brackets is furnished with inclined slots, in which the rollers bear, together with a pivoted catch, to hold them in position, by which means any or all of the rollers and aprons can be withdrawn, and others inserted at pleasure.

In the accompanying drawings, which show a convenient arrangement of parts for carrying out the objects of my invention, A represents a frame, of wood or metal, which may rest upon casters, if desired to be portable, or be secured to the floor, as deemed most convenient.

An apron, B, upon which hymns, diagrams, &c., which it is desired to exhibit, may be printed, or secured by pasting, or other suitable means, is wound upon a roller, $B^1$, at the rear of the frame.

This apron passes over and around a friction-roller, $a$, near the top of the frame.

A detachable apron, C, upon which another series of hymns, &c., may be placed, is connected, by hooks and eyes, to the lower end of the apron B.

The connection is made by means of two strips of wood, $c$ and $b$, which are fastened respectively to the adjacent ends of the aprons C and B, and united by hooks and eyes, or other suitable fastening, so as to be quickly and easily connected or disconnected.

The apron C passes under and around a friction-roller, $a'$, and is rolled upon a roller, D.

By rotating the crank $B^2$ upon the roller $B^1$, the apron B is rolled up out of sight, and the apron C brought into view.

Brackets E $E^1$ are attached to the back of the frame A, provided with bearings, in which rollers D rest, having rolled upon them aprons of similar construction to C.

The bearings in the bracket E are formed in inclined slots $e$, from which the journal of the roller may be withdrawn by raising the pivoted catch $E^2$, which is attached, by its upper end, to the bracket E, and confined by a spring, or other suitable means. By this arrangement, any or all of the rollers D may be withdrawn at pleasure, and others inserted. Their aprons may be either connected to the apron C, in the manner hereinbefore described, or the latter detached, and the required apron connected directly to the apron B, enabling the teacher or lecturer to exhibit that which he requires, without trouble or delay.

Having thus fully described my invention,

What I claim therein as new, and desire to secure by Letters Patent, is—

1. The combination, with the primary apron B, of one or more detachable aprons, C, adapted to be readily connected to or disconnected from the former, substantially as and for the objects stated.

2. In combination with the above, I further claim the bracket E $E^1$, inclined slots $e$, and pivoted catch $E^2$, for the purpose of applying new rolls, in the manner described.

HENRY V. EDMOND.

Witnesses:
N. G. LIPPITT,
S. B. MEECH.